July 31, 1928.  
H. CASSEREAU  
1,679,239  
PHOTOGRAPHIC FILM DRIER  
Filed Sept. 3, 1927 4 Sheets-Sheet 4
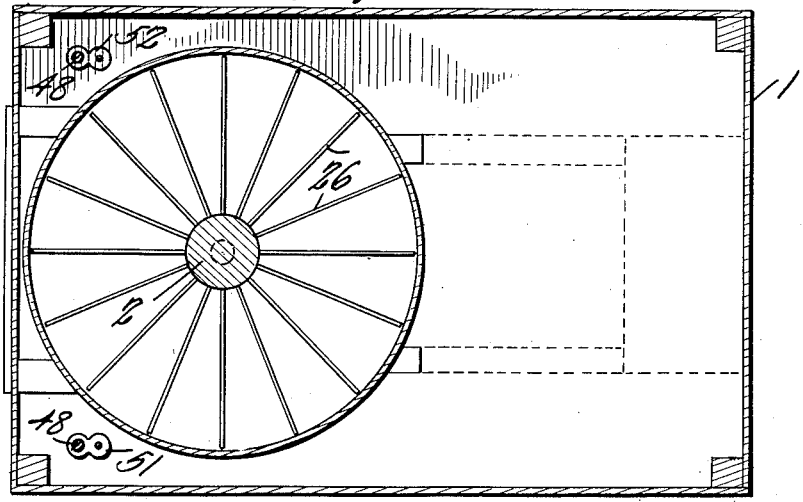
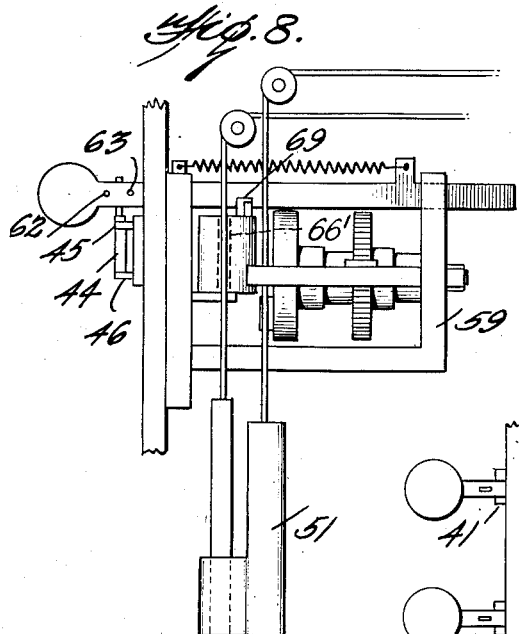
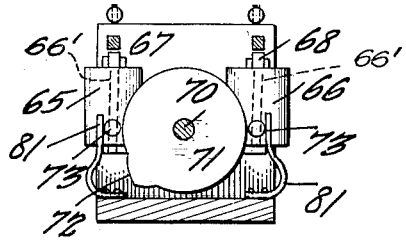
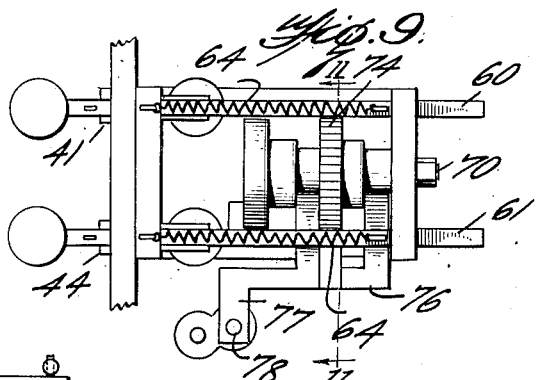
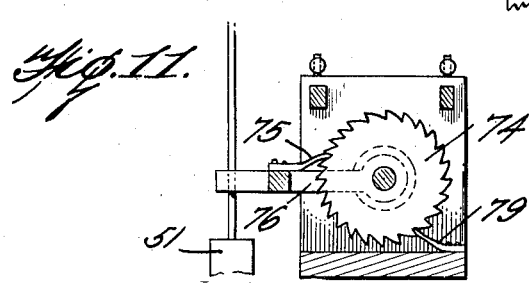
INVENTOR.  
H. CASSEREAU,  
BY Gould & Gould.  
ATTORNEY.

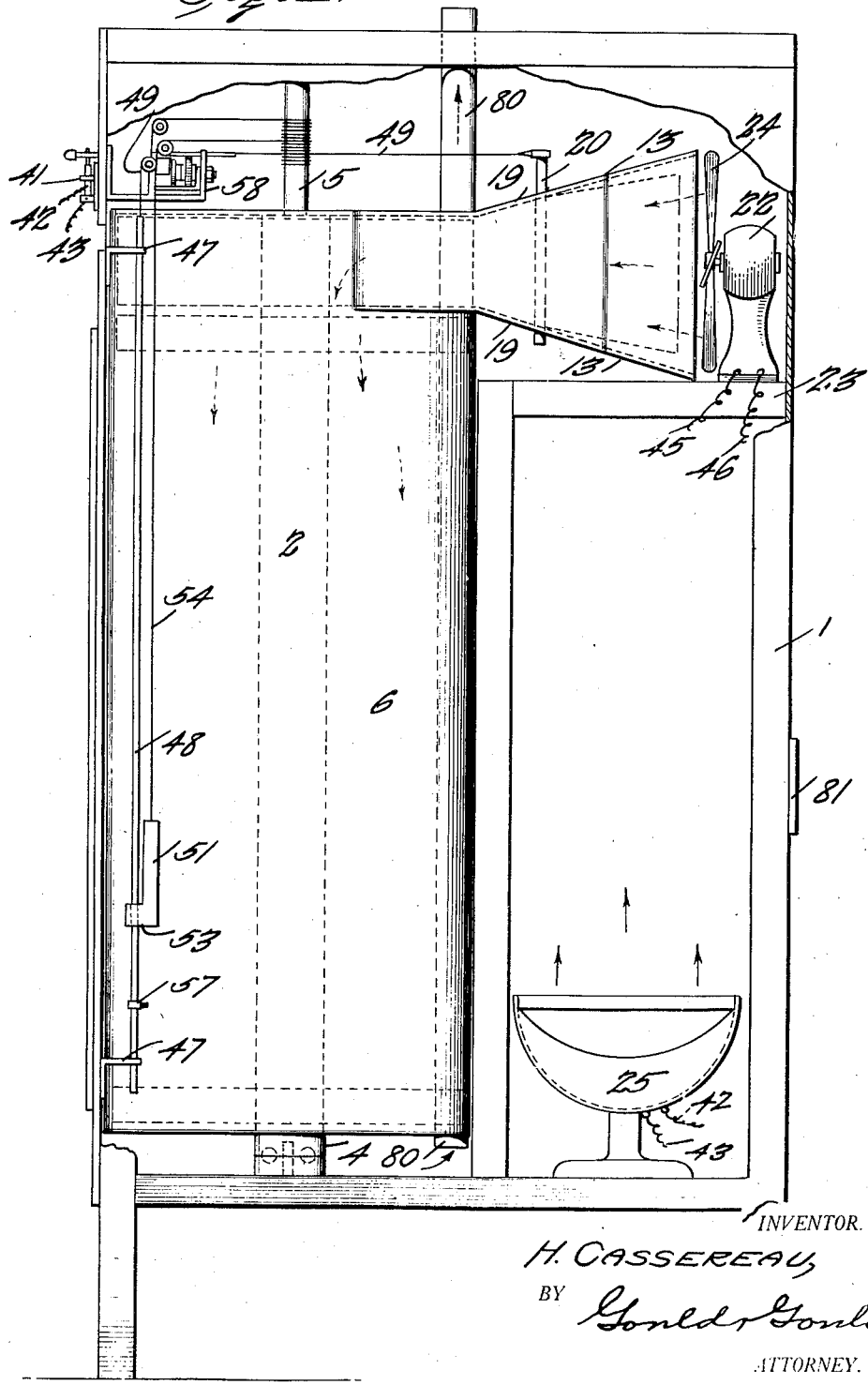

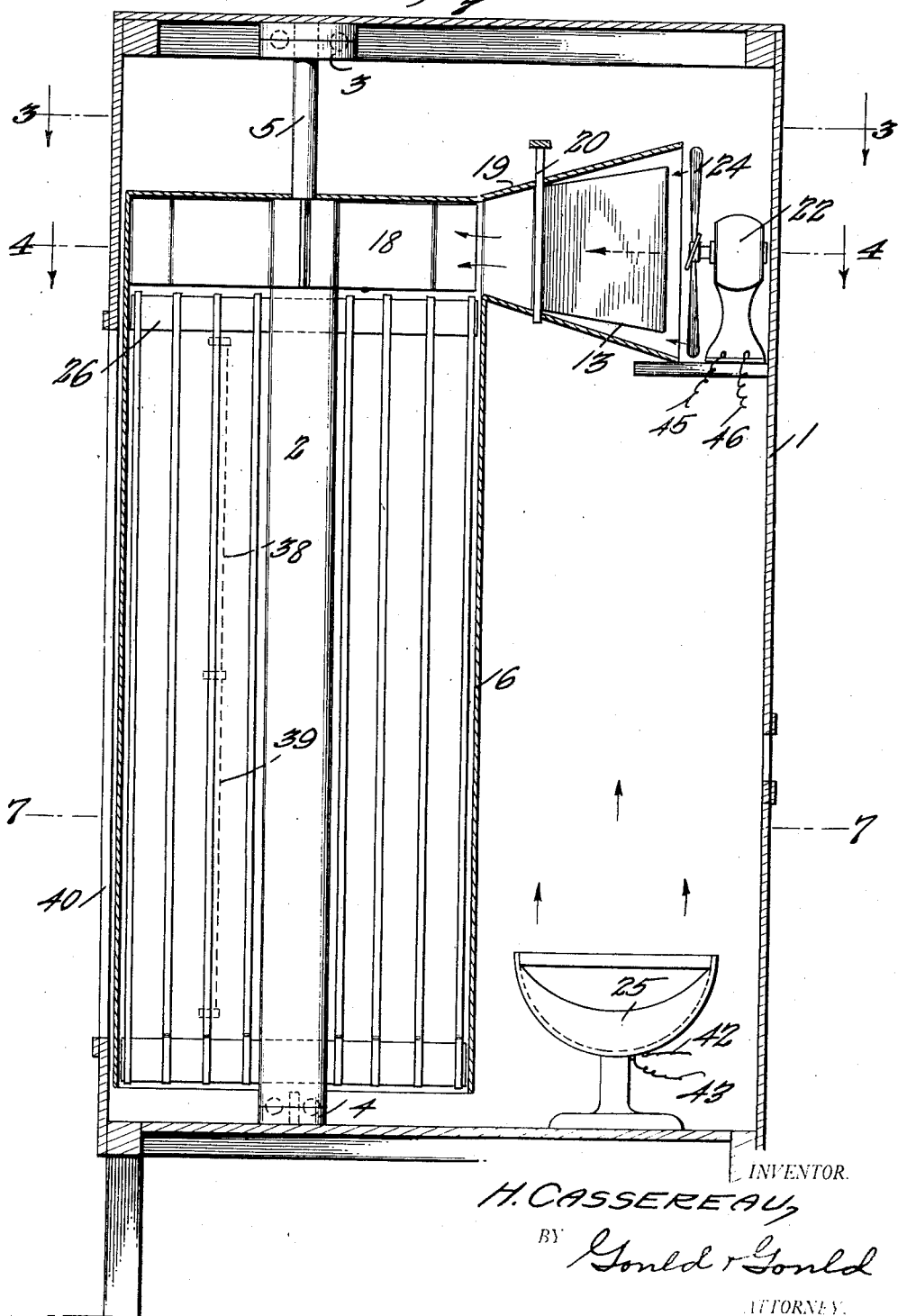

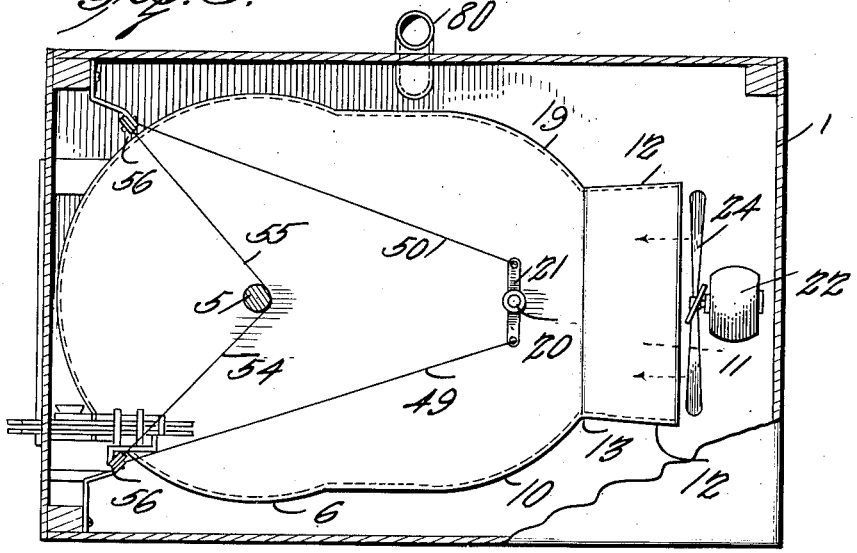
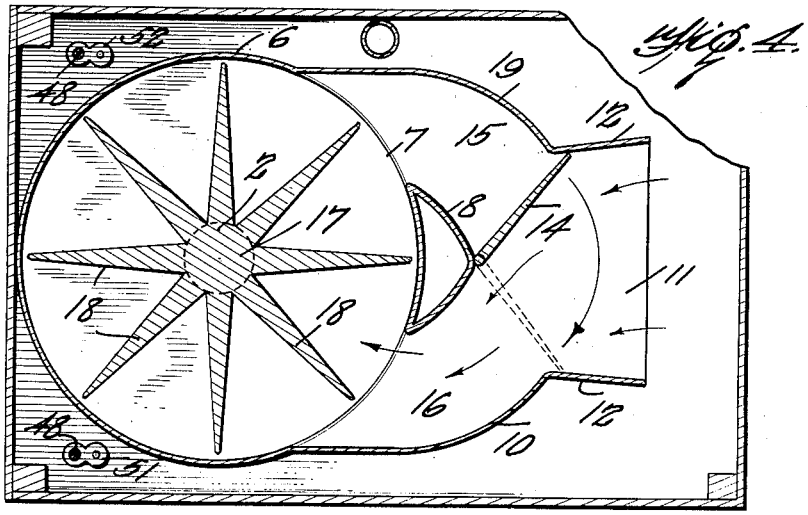
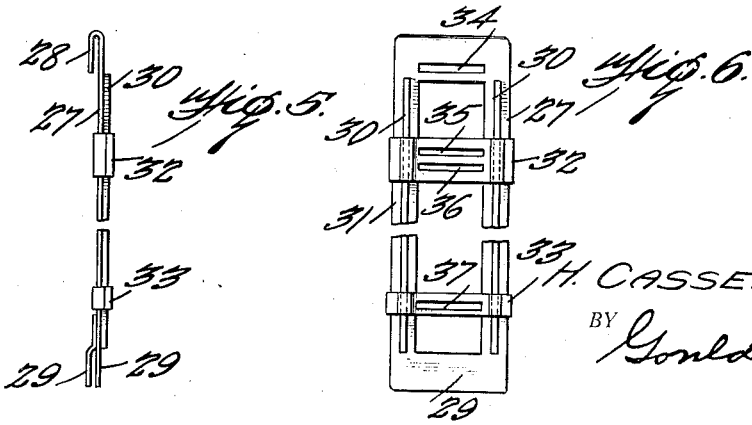

Patented July 31, 1928.

1,679,239

UNITED STATES PATENT OFFICE.

HENRI CASSEREAU, OF MEXICO CITY, MEXICO.

PHOTOGRAPHIC-FILM DRIER.

Application filed September 3, 1927, Serial No. 217,380, and in Mexico September 29, 1926.

This invention relates to photographic film drying machines wherein the films are subjected to a constant current of heated air delivered in a manner for the most effective drying of the films.

The main object of the present invention is the provision of means for supporting the films for bodily movement in a reversible rotary path and utilizing the current of heated air as a means for compelling the bodily movement of the films during their drying operation.

A further object of the invention is the provision of means for creating a heated current of air and means for directing this current of air under pressure to the film chamber, the alternate rotary movements of the film controlling a mechanism which, following a predetermined operation, automatically cuts off the heating means and subsequently and automatically cuts off the blower.

A further object of the present invention is the provision of a film chamber in which the films may be readily and quickly suspended and from which they may be easily removed, the films within the chamber being adapted as a whole for rotary reciprocation and being utilized in such rotary reciprocation for controlling mechanism which will insure the rotary reciprocation and which may be set at will to cut off the power means for the heater following any desired period of operation.

A further object of the invention is the provision of a film chamber in which the films are mounted for rotation and operated through the medium of a rotor subjected to heated air under pressure from a blower, a gate being provided to direct the air pressure to rotate the film carrier alternately in opposite directions, the rotation of the film carrier controlling mechanism adapted to automatically shift the gate at periodic intervals to reverse the rotation of the carrier.

The invention is illustrated in the accompanying drawings, in which:

Figure 1 is a view in section, partly in elevation, of the improved apparatus.

Figure 2 is a vertical section view, the electrical and mechanical controls being omitted.

Figure 3 is a section on line 3—3 of Figure 2.

Figure 4 is a section on line 4—4 of Figure 2.

Figure 5 is a broken edge view of the film support.

Figure 6 is a broken elevation of the same.

Figure 7 is a section on line 7—7 of Figure 2.

Figure 8 is a side elevation of the mechanical and electrical control.

Figure 9 is a plan of the same.

Figure 10 is a transverse sectional view, partly in elevation, of the same, showing means for operating the switch release.

Figure 11 is a section on line 11—11 of Figure 9.

The improved film drier, in the preferred embodiment illustrated in the drawings, comprises a casing or enclosure 1 of appropriate size and preferably constructed of wood though obviously of any material if desired. Within this casing near one end wall is arranged a film carrier shaft 2 mounted at its upper and lower ends in appropriate bearings 3 and 4 and of reduced diameter at its upper end to provide a winding section 5. A metallic cylinder 6 is arranged concentric with the shaft 2, this cylinder being open at its lower end and formed near its upper end with an opening 7 centrally divided by a deflector 8 with its outer walls 9 and 10 extending substantially tangentially of the cylinder and terminating in a flaring entrance 11 defined by side walls 12 and top and bottom walls 13.

Mounted at the forward edge of the deflector 8, which deflector is of substantially triangular formation, is a gate 14 pivoted for movement into contact with one or the other of the side walls 12 of the entrance 11, this gate when in one position or the other directing the air admitted through the entrance 11 into channels 15 or 16, the first being defined by the deflector 8 and the side wall 9 and the latter being defined by the deflector 8 and the side wall 10. The construction described provides means whereby the air forced through the entrance 11 may be directed into the upper portion of the cylinder 6 in a stream directed to one side or the other of the axial line of the cylinder.

A rotor 17 having radial blades 18 is fixed upon the shaft 2 in line with the air passages 15 and 16, so that the shaft 2 will be obviously rotated in one direction or the other in accordance with the position of the gate 14. The air passages 15 and 16 are of course closed at the top and bottom, as by walls 19, and the shaft 20 of the gate 14 extends through the upper wall 19 and is provided with a transverse bar 21 through which the movement of the gate is controlled, as will later appear.

A motor 22 is supported upon a framework 23 within the casing 1 and the shaft of the motor carries a fan wheel 24 by means of which air is forced into the entrance 11 as will be apparent.

As previously stated, the drying cylinder 6, which is preferably of metal, is located at one side of the casing 1 and at the lower end of such casing in the space beyond the cylinder 6 is arranged an electric heater 25. Obviously, the air beyond the cylinder 6, as well as the wall of the cylinder, is heated and this heated air is forced by the fan blades 24 into the entrance opening 11 to not only rotate the film carrier but also dry the films.

Supported by and fixed to the shaft 2 below the rotor 17 are film carrying arms 26, preferably radiating from the shaft and extending to but free of contact with the fixed cylinder 6. These arms 26 are preferably arranged at the respective ends of the cylinder below the rotor 17 and are designed to removably support films for which a special carrier, illustrated more particularly in Figures 5 and 6, is provided. This carrier comprises a rectangular skeleton frame 27 provided at the upper end with a hook 28 and at the lower end with an engaging section made up of spaced plates 29.

Slidably mounted on guides 30 on the vertical bars 31 of the frame are upper and lower film supports 32 and 33, these supports being freely slidable vertically on the frame. The frame near its upper end is formed with a transverse slot 34 and the uper film support 32 is formed with two similar parallel slots 35 and 36. The lower film support 33 is formed with a single similar slot 37.

The films are connected to the carriers preferably in pairs, each film having the usual hook applied to the upper and lower ends thereof. The hook at one end of the upper film 38 is engaged in the slot 34 and the upper support 32 is moved upwardly on the frame so that the hook at the lower end of such film 38 may be engaged in the upper slot 35 of that support. As the supports are free to gravitate on the carrier, the upper film will be stretched following this application. The lower film 39 is then applied, the hook at one end thereof being engaged in the lower slot 36 of the upper support 32 while the hook at the opposite end of the film 39 is engaged in the slot 37 of the lower support 33. Both films are thus stretched in comparatively flat condition on the carrier.

Obviously, as many carriers as may be necessary can be used, such when provided with films being introduced through a doorway 40 in the casing 1 and a similar opening in the cylinder 6, the carriers being applied to the film carrying arms 26 by engaging the hook 28 of each carrier over one of the upper arms 26 and causing the spaced plates 29 at the lower end of the carrier to embrace the corresponding lower film carrying arm 26. These arms are of a length to accommodate several carriers and as there are a number of arms, it is of course apparent that the machine will accommodate a large number of films if desired.

It will be apparent from the above that the blower for rotating the films and the heater for heating the air are electrically controlled and further that provision must be made to control the gate 14 in order that the film carrier may be reversely rotated for a proper drying effect. The present invention contemplates the automatic control of this gate and the automatic control of the energization of the heater and the motor and to actuate or govern this control directly by the movement of the film carrier. This control is indicated more particularly in Figures 1, 8, 9, 10 and 11 of the drawings and includes a switch of the single-throw type, indicated at 41, for governing conductors 42 and 43 leading to the heater and a similar switch 44 for governing conductors 45 and 46 leading to the motor.

Slidably supported in brackets 47 on each side of the cylinder 6 is a guide rod 48, the upper ends of which are connected by cables 49 and 50 to the respective ends of the bar 21 on the upper end of the shaft 20 of the gate 14. Weights 51 and 52 are slidable on the respective guide rods 48, each weight being preferably provided with an offset extension 53 formed with an opening to receive the guide rod. The weights are connected adjustably in any appropriate manner to the terminals of cables 54 and 55 which extend upwardly over guide rollers 56 and to and wound in opposite directions about the winding section 5 of the shaft 2. Arranged on each guide rod is an adjustable stop 57 adapted to be engaged by the cooperating weight in its downward movement to cause a corresponding downward movement of the guide rod 48.

Supported on a bracket 58 mounted above the cylinder 6 is the automatic control for the switches 41 and 44. This control includes a framework 59 in which are slidably mounted bars 60 and 61. These bars are provided with pins 62 arranged on opposite sides of the handles of the respective switches 41 and 44, so that as the bars are moved in one direction, the switches will be closed and as the bars are moved in the opposite direction, the switches will be opened. Springs 64 are connected to the framework 59 and to the respective bars, these springs being under tension when the bars are in position to permit or cause cloing of the switches, so that when the bars are free the springs will act to move the bars in a direction to open the switches.

Supported in the framework 59 are cylindrical members 65 and 66. These members mounted for rotation are arranged one beneath each switch bar 60 and 61. Projecting from the upper ends of the members 65 and 66 are lugs 67 and 68, these lugs being eccentrically arranged on the upper ends of the members 65 and 66 and adapted in one position of the members to seat in a slot 69 in the lower ends of the bars 60 and 61 to hold the bars in a position to maintain the switches closed, that is, with the springs 64 under tension.

Supported in the framework 59 between the members 65 and 66 is a shaft 70 on which, immediately in advance of the members 65 and 66, is fixed a cam disk 71 having a cam projection 72. Projecting from the respective members 65 and 66 are pins 73 arranged in the path of movement of the cam projections 72. Thus, the disk 71 is rotated, the cam projection 72 will engage the pin 73 of the member 65, for example, rotate this member on its axis, withdraw the lug 67 at the upper end of the member from the groove or channel 69 in the switch bar 60 and permit the spring 64 of that switch bar to move said bar longitudinally. In this movement, the pin 63 on this bar cooperates with the handle of switch 41, opens such switch and the heater 25 is deenergized. As the disk 71 continues to move, its cam projection 72 will engage the pin 73 of the remaining member 66 and so open switch 44 and deenergize the motor 22. The disk 71 is operated in a step by step movement through a ratchet 74 fixed on the shaft 70 and engaged by a feeding pawl 75 carried by a lever 76 terminally mounted on the shaft 70 and having a projection 77 formed with an opening 78 through which the cable 54 freely passes. A spring pawl 79 is provided to prevent return movement of the ratchet. Springs 81 are provided to bear against the pins 73, to maintain such pins in operative contact with the cam disk 71, to insure the operation of the parts as described.

In operation, assuming that the films are in place on the film carrier, the switches 41 and 44 are closed, energizing the motor and heater, and the members 65 and 66 are turned to latch the switch operating bars 60 and 61 in their normal positions. Of course, in this condition the gate 14 is turned to one position or the other. As the motor starts, the air heated by the heater is directed through the entrance 11 and, for example, through the passage 16 and against the rotor 17, revolving the shaft 2 and the films supported on the arms 26 in one direction. As the movement continues, the weight 51, for example, is moving downwardly and the weight 52 moving upwardly due to the unwinding and winding of the respective cables 54 and 55. As the weight 51 reaches the stop 57 on the guide rod 48, the guide rod is moved downwardly exerting a pull upon the cable 49 and shifting the gate to the other position. The heated air under pressure is then directed through the passage 15 and the film carrier rotated in the opposite direction. The weight 51 now moves upwardly and the weight 52 downwardly. As the weight 51 moves upwardly, it will engage the projection 77 of the lever 76 and so advance the ratchet 74 and thereby the disk 71 to the extent of one or more teeth. Of course, as the weight 52 moves downwardly it will eventually engage the stop 57 on the other guide rod 48 and again reverse the gate and direct the opposite rotation of the film carrier. As this operation is carried out, the weights 51 and 52 alternately rise and fall, serving at each downward limit of movement to reverse the gate 14 and so change the direction of rotation of the film carrier. At each upward limit of movement of the weight 51, the disk 70 is advanced until finally the member 65 is engaged and turned and the switch bar 60 released to the influence of its spring 64 and the switch 41, which controls the energy of the heater, is opened. The heater is thus cut out. As the motor continues its operation, the film carrier continues to rotate in reverse directions and the disk 70 is further periodically rotated until finally the member 66 is operated, releasing the switch bar 61 to the influence of its spring 64, when the switch 44 is opened, the energy to the motor cut off and the apparatus brought to a stop. The films may be removed through the openings 40.

As the cables 54 and 55 are designed to be adjustably connected to their respective weights 51 and 52 and as the stops 57 on the guide rods 48 may be fixed in any position longitudinally of said rods, it is apparent that the duration of the operation of the heater, of the motor and of the continued rotation of the film carrier in any one direction before reversal may be more or less accurately controlled at will, and the films selectively subjected to practically any degree of heat treatment necessary. The entire device is automatic following the application of the films and the closing of the switches 41 and 44, it being apparent that the fan 24 not only directs the rotation of the film carrier but also the circulation of heated air by which the films are evenly and properly dried. Furthermore, the metallic nature of the cylinder 6 serves through radiation to assist in the heating effect on the films.

The film chamber is provided with an escape duct or vent 80 opening at the bottom of the chamber and extending longitudinally of the casing 1 and discharging at the upper end. This vent provides for the escape of moisture-laden air during the operation of the drier. The casing 1 is also provided with an opening controlled by a gate 81 designed to admit cool air in regulatable quantity.

What I claim to be new is:

1. In a film drier, a reversely-rotatable film carrier, gaseous pressure means for rotating said carrier, means for directing such gas under pressure over the films as a drying medium, and means controlled by the rotation of the carrier for governing the direction of rotation.

2. In a film drier, a reversely-rotatable film carrier, means for heating air, means for directing such heated air under pressure for rotating the carrier, and means controlled by the rotation of the carrier for governing the direction of rotation.

3. In a film drier, a film carrier arranged for rotary movement, an air heater, a pressure means for directing the heated air under pressure to rotate the carrier, and into contact with the films, and control means operated by the rotation of the carrier for cutting out the heater and cutting off the pressure means following a predetermined period of operation.

4. In a film drier, a film carrier arranged for rotary movement, an air heater, a pressure means for directing the heated air under pressure to rotate the carrier and into contact with the films, and control means operated by the rotation of the carrier for cutting out the heater and cutting off the pressure means following a predetermined period of operation, said control means being selectively adjustable to determine the period of operation.

5. A film drier including a rotating film carrier, means for removably supporting a series of films thereon, an air heater, a fan for directing the heated air onto the films, a rotor secured to the carrier and subject to the heated air from the fan to rotate the carrier, and means controlled by the rotation of the carrier to cause the heated air from the fan to periodically reverse the rotor and thereby the carrier.

6. A film drier including a rotating film carrier, means for removably supporting a series of films thereon, an air heater, a fan for directing the heated air onto the films, a rotor secured to the carrier and subject to the heated air from the fan to rotate the carrier, a gate for controlling the direction of heated air from the fan for affecting the rotor, and means controlled by the rotation of the carrier for periodically reversing the gate to thereby reverse the carrier.

7. In a film drier, a casing, a film chamber therein, a film carrier mounted for rotation within the chamber, an air heater in said casing beyond the chamber, a blower to direct the heated air into the chamber, means connected to said film carrier and responsive to the air from the blower to rotate the carrier, and means controlled by the rotation of the carrier to direct the heated air from the blower so as to periodically reverse the direction of carrier rotation.

8. In a film drier, a casing, a film chamber therein, a film carrier mounted for rotation within the chamber, an air heater in said casing beyond the chamber, a blower to direct the heated air into the chamber, a rotor mounted on the carrier and responsive to the air from the blower for rotating the carrier, and means positioned by and in the rotation of the carrier to control the path of air from the blower and thereby the direction of movement of the rotor.

9. In a film drier, a casing, a film chamber therein, an air heater arranged in the casing beyond said chamber, a blower arranged in the casing beyond the chamber, a film carrier rotatable in the film chamber, a rotor on the film carrier, an air conduit leading from the blower to the rotor and chamber, said conduit being divided into separate passages leading to opposite sides of the rotor axis, a gate for closing either passage, and means operated by the rotation of the carrier for moving the gate to successively close the respective passages, whereby to reversely rotate the carrier.

10. In a film drier, a casing, a film chamber therein, an air heater arranged in the casing beyond said chamber, a blower arranged in the casing beyond the chamber, a film carrier rotatable in the film chamber, a rotor on the film carrier, an air conduit leading from the blower to the rotor and chamber, said conduit being divided into separate passages leading to opposite sides of the rotor axis, a gate for closing either passage, rods movable lengthwise the casing, connections between the rods and gate to turn the latter in the movements of the rods, weights slidable in the rods and movable thereon in the rotation of the carrier, and stops on the rods to be engaged by the weights when moving in one direction to move the rods and shift the gate.

11. In a film drier, a film chamber, a film carrier rotatable therein, an electric air heater, an electrically-driven blower for directing the heated air into said chamber, a switch for controlling the energization of the air heater, a switch for controlling the energization of the blower, means whereby the air from the blower may rotate the film carrier, and means operated by the rotating film carrier for operating said switches to deenergize the heater and blower.

12. In a film drier, a film chamber, a film carrier rotatable therein, an electric air heater, an electrically-driven blower for directing the heated air into said chamber, a film support removably cooperating with the carrier, a switch for controlling the air heater, a switch for controlling the blower, means whereby the air from the blower is utilized to rotate the film carrier, and members reciprocated by the rotating film carrier for operating said switches to cut off the heater and blower at successive intervals.

13. In a film drier, a film chamber, a film carrier rotatable therein, an electric air heater, an electrically-driven blower for directing the heated air into said chamber, a film support removably cooperating with the carrier, a switch for controlling the air heater, a switch for controlling the blower, means whereby the air from the blower is utilized to rotate the film carrier, switch operating bars, springs for operating the bars to open the switches, means for holding the bars against the action of the springs, a member operable to actuate the holding means to release the bars, and elements reciprocated in the rotation of the film carrier for operating said member.

14. In a film drier, a film chamber, a film carrier rotatable therein, an electric air heater, an electrically-driven blower for directing the heated air into said chamber, a film support removably cooperating with the carrier, a switch for controlling the air heater, a switch for controlling the blower, means whereby the air from the blower is utilized to rotate the film carrier, switch operating bars, springs for operating the bars to open the switches, means for holding the bars against the action of the springs, a member operable to actuate the holding means to release the bars, and elements reciprocated in the rotation of the film carrier for imparting a step by step movement to said member.

15. In a film drier, a film chamber, a film carrier rotatable therein and having upper and lower radiating arms, a rotor above the arms, removable film supports on said arms, means for directing a current of air against the rotor and lengthwise the film carrier to rotate the film carrier and dry the films, and means operated in the rotation of the film carrier to control the direction of rotation and to control the duration of operation of the air current directing means.

In testimony whereof, I affix my signature.

HENRI CASSEREAU. [L. S.]